United States Patent Office 3,567,312
Patented Mar. 2, 1971

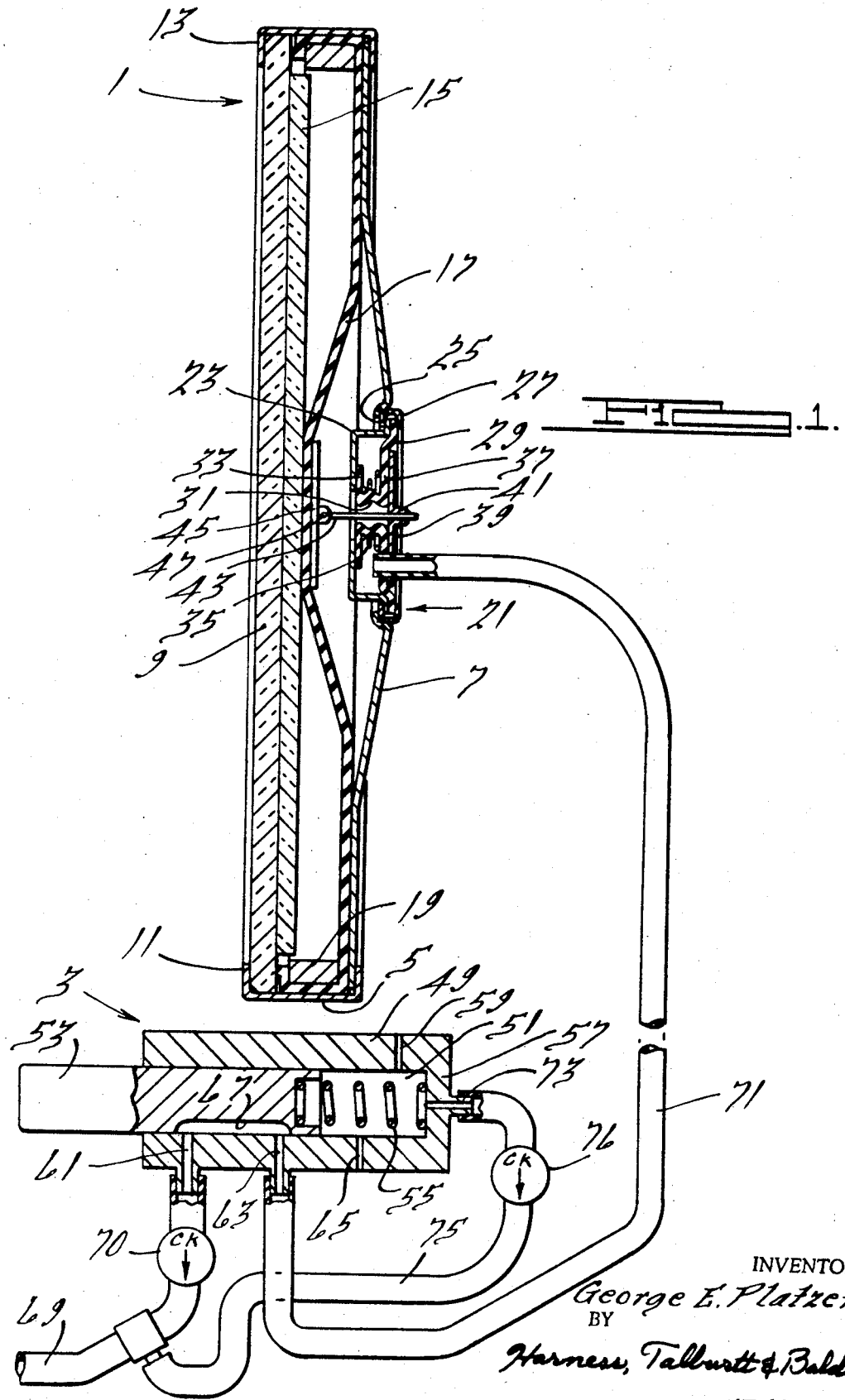

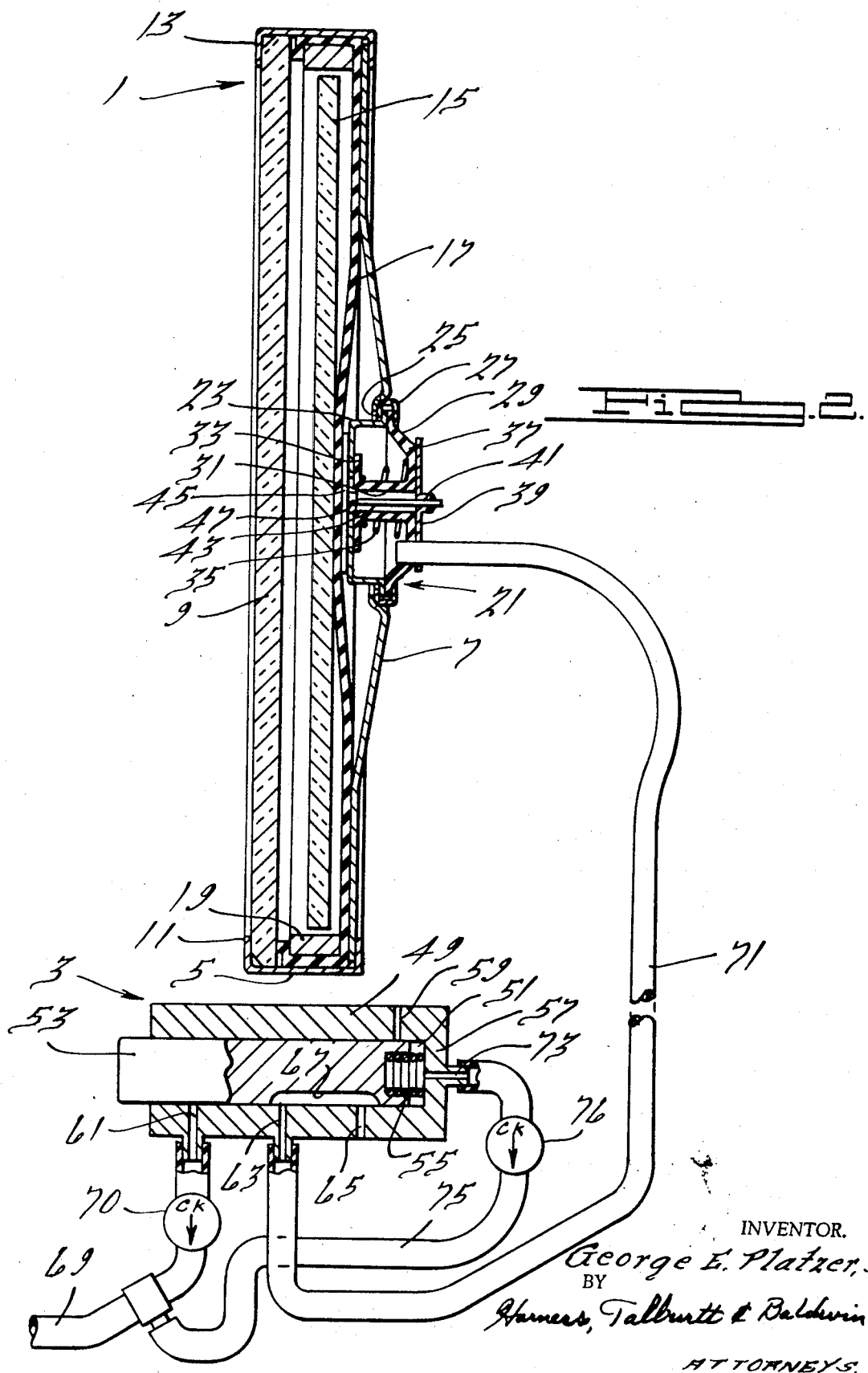

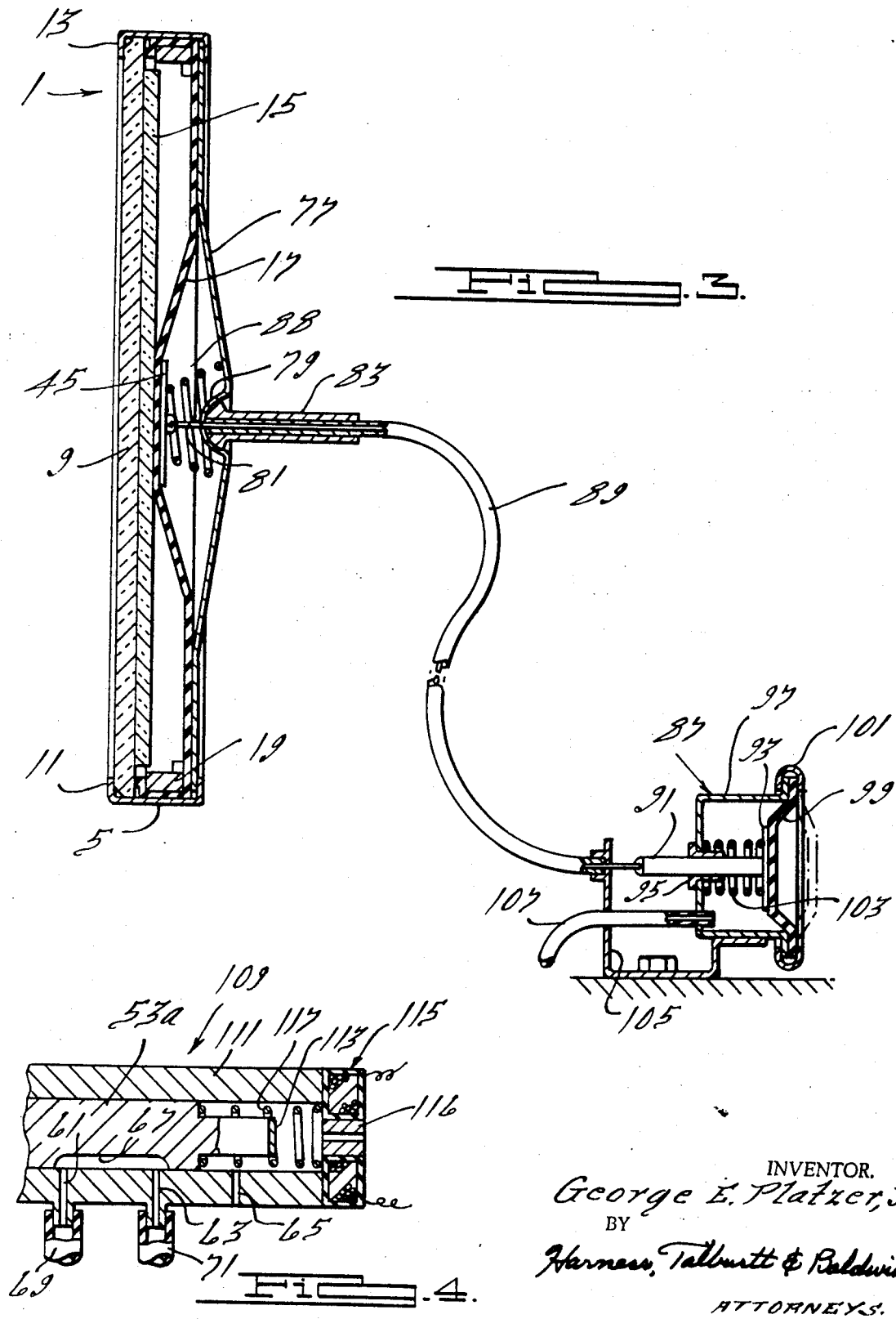

3,567,312
DAY-NIGHT MIRROR ACTUATION APPARATUS
George E. Platzer, Jr., Southfield, Mich., assignor to Chrysler Corporation, Highland Park, Mich.
Filed Nov. 1, 1968, Ser. No. 772,611
Int. Cl. G02b 5/08
U.S. Cl. 350—280            6 Claims

ABSTRACT OF THE DISCLOSURE

Mirror actuating apparatus including a fluid immersed mirror, a pressure operated mechanism for moving the mirror, and a control mechanism for energizing the pressure operated mechanism to move the mirror to one of two positions when the vehicle engine is started.

BACKGROUND OF THE INVENTION

This invention relates to mirrors of the type containing a fluid light controlling medium and especially to mirrors of this type suitable for use as a rear view mirror either inside or outside of a motor vehicle. In particular, this invention relates to apparatus for actuating a two-position or day-night rear view mirror employing a fluid control medium from one position to another.

Mirrors of the type generally described above are well known. These mirrors contain a fluid control medium of optically dense character capable of inhibiting glare which will mask or block out reflection of the mirror in its night position so as to avoid double images dangerous to driving at night. It has been found that some fluids may cause a stain to develop on the mirror or on the front plate of the mirror if the mirror is left in the bright or day position and exposed to ultraviolet light for a considerable length of time. If the mirror is actuated relatively frequently, such as once a day, for example, and is located in its retracted or night position when the vehicle is not operating, it has been found that stains are unlikely to develop. Furthermore, when a mirror of this type has remained in its bright position for an extended period of time, occasionally localized areas of the fluid increase in opacity resulting in a blotchy appearance of the mirror surface. This blotchiness could be described as a temporary stain. The apparatus of this invention is adapted to automatically actuate the mirror whenever the vehicle engine is started to prevent temporary or permanent stains.

BRIEF SUMMARY OF THE INVENTION

Briefly, this invention comprises a mirror actuating apparatus including an automotive mirror immersed in fluid, a pressure operated mechanism for moving the mirror between a day and a night position, and a control mechanism for energizing the pressure operated mechanism to move the mirror to one of its positions when the automotive engine is started.

One of the primary objectives of this invention is to provide apparatus for preventing the creation of stains, either permanent or temporary, on two-position mirrors containing fluid light controlling medium.

Another object of this invention is to provide apparatus of the type described which is adapted to place the mirror in a night position whenever the engine is not running, but which actuates the mirror to a day position whenever the engine is started.

A further object of this invention is to provide apparatus such as described which permits movement of the mirror from a day position to the night position even though the engine is running.

Still another object of this invention is to provide apparatus of the class described which utilizes the engine manifold pressure for permitting actuation of the mirror between its two positions.

A further object of this invention is to provide apparatus of the type described which is economical in construction and effective in operation.

Other objects and advantages of this invention will be made apparent as the description progresses.

BRIEF DESCRIPTION OF THE DRAWINGS

Referring now to the drawings in which several of various possible embodiments are illustrated, FIG. 1 is a side elevation partially in section showing the apparatus of this invention with the mirror in a day position;

FIG. 2 is a view similar to FIG. 1 showing the mirror in the night position;

FIG. 3 is a side elevation partially in section of an alternative mirror actuating structure; and FIG. 4 is a section view illustrating another alternative embodiment of a portion of the apparatus.

Like parts are indicated by corresponding reference characters throughout the several views of the drawings.

Referring now to the drawings, the apparatus of this invention is generally shown in FIG. 1 to include a mirror assembly 1 and a control assembly 3. Mirror assembly 1 includes a housing or casing 5 open at what will be referred to as its forward side and closed at its rearward side by a wall 7. The forward or open side of casing 5 is closed by a sealing glass or window 9 comprising a piece of clear transparent glass plate disposed against shoulders 11 and 13 of casing 5. Suitable sealing means, not shown, may be employed for maintaining the casing fluid tight.

Disposed directly behind the clear glass plate window 9 is a mirror or reflector generally designated 15. The mirror preferably comprises a plate of suitable material, such as glass, which has a mirrored surface on the side thereof adjacent and facing the window 9. It will be understood, however, that the plate of suitable material may be of optically clear glass having the mirrored surface on its rearward side, i.e., the side most remote from the window.

A flexible diaphragm 17 of suitable flexible material extends across the casing and may be secured at its edges to the casing by a clamping member, such as a frame 19. The central portion of diaphragm 17 is joined, with adhesive for example, to the mirror 15. It will be understood that the chamber formed by diaphragm 17 and the glass window 9 is filled with a fluid light controlling medium. A satisfactory fluid may be constituted of a stable colloidal suspension of carbon black particles in a solvent such as kerosene. A specific fluid suitable for this purpose is disclosed in U.S. patent application Ser. No. 660,209.

An actuating mechanism for moving the mirror between a day position, shown in FIG. 1, to a night position, shown in FIG. 2, is generally indicated at 21. Mechanism 21 extends through an opening in the rear wall 7 and includes a cup-shaped housing 23 having a radially extending flange 25 at its outer edge. A channel-shaped ring or clamp 27 connects flange 25 to the outer edge of a flexible diaphragm member 29. Clamp 27 is secured, as by brazing or welding for example, to the rear wall 7 around the opening therein. Diaphragm 29 has a centrally located tubular portion 31 extending forwardly away from the rear wall. An annular flange 33 is provided on the outer end of the tubular portion 31 and is secured to the bottom of the cup-shaped housing 23 around an opening in the latter. A compression spring 35 extends between the large annular flange portion 37 of diaphragm 29 and the smaller annular flange 33 of the diaphragm. Spring 35 tends to bias apart the flanges 33 and 37. Attached to the rear side of annular flange 37 is a disc 39 having a tubular fitting 41 located in the center thereof.

The rearward end of an actuating wire or rod 43 is secured to the fitting 41 in a fluid-tight relationship. The wire extends forwardly through tubular portion 31 of the diaphragm 29 and through the hole in the bottom of cup-shaped housing 23 to a plate 45 secured to the central portion of diaphragm 17. Rod 43 is connected to plate 45 by a pivoted connection 47.

It will be seen that when the pressure within the annular chamber formed by cup-shaped housing 23 and diaphragm 29 is reduced below a predetermined value, the flexible diaphragm 29 will move toward the bottom of the housing 23 and compress spring 35. In so moving, the diaphragm moves disc 39, rod 43, plate 45, the central portion of diaphragm 17 and mirror 15 from the position shown in FIG. 2 to the position shown in FIG. 1, i.e., from a night position to a day position. When normal atmospheric pressure exists in the chamber formed by housing 23 and diaphragm 29, the spring 35 moves the parts to the FIG. 2 position.

The control apparatus 3 for controlling the pressure within the chamber formed by housing 23 and diaphragm 29 includes a valve body 49 having a chamber or cylinder 51 therein. A valve member 53 is slideable in chamber 51. Valve member 53 is slideable in chamber 51. Valve member 53 is biased outwardly of the chamber to the position shown in FIG. 1 by a compression spring 55 extending between a recessed inner end of member 53 and the end wall 57 of body 49. Three ports 61, 63 and 65 are formed in the wall of body 49 and are spaced apart from one another by a distance such that ports 61 and 63 or 63 and 65 may be placed in communication with one another by a recess 67 in valve member 53 when the latter is moved to the proper position.

Port 61 is connected by a line 69 to the interior of a normally subatmospheric component of the engine, such as the intake manifold (not shown) of the vehicle engine. A check valve 70 is located in line 69 and will open when the pressure in port 61 is higher than the pressure in the portion of line 69 between the check valve and the intake manifold. Port 63 is connected by a flexible line 71 to the interior of the compartment formed by housing 23 and diaphragm 29. Port 65 connects the chamber 51 with the atmosphere. A port 73 extends through end wall 57 and is connected to line 69 by a line 75. A check valve 76 is located in line 75 and will open when the pressure in port 73 is higher than the portion of line 75 between valve 76 and line 69. It will be understood that commercial check valves, such as valves 70 and 76, do not function perfectly and some leakage thereby occurs.

It will be seen that when the valve member 53 is in the position shown in FIG. 1 and the manifold pressure is applied to line 69, such pressure is placed in communication with the compartment formed by housing 23 and diaphragm 29 by means of port 61, recess 67, port 63 and line 71. The manifold pressure is also supplied to the chamber 51 by line 75 and port 73. This low pressure is insufficient to overcome the force exerted on valve member 53 by spring 55 due to the vent provided by port 65. Moreover, the passage 65 reduces the effect of the low manifold pressure on the valve member 53. When the valve member 53 is in the position shown in FIG. 2, the compartment formed by housing 23 and diaphragm 29 is placed in communication with the atmosphere through line 71, port 63, recess 67 and port 65. If the engine is running, the intake manifold pressure is placed in communication with the chamber 51 by line 69, line 75 and port 73. The port 73 is no longer in communication with port 65, but is in communication with the intake manifold pressure through lines 75 and 69 which is sufficient to prevent the spring 55 from moving member 53.

Operation of the apparatus of this invention is as follows:

It will be assumed that the engine is running and that the various parts of this apparatus are in the position shown in FIG. 1. In such position the manifold pressure is applied to the compartment formed by housing 23 and diaphragm 29 so that the diaphragm is held in its FIG. 1 position. Accordingly, the mirror 15 is held in its day position against glass window 9. If it is desired to move the mirror to its retracted or night position, the valve member 53 is pushed inwardly to the FIG. 2 position. This blocks communication between lines 69 and 71 and establishes communication between the atmosphere and the interior of the compartment formed by housing 23 and diaphragm 29 through port 65, recess 67, port 63 and line 71. With the presence of atmospheric pressure in the compartment formed by housing 23 and diaphragm 29, the spring 35 expands and moves disc 39, rod 41, plate 45, diaphragm 17 and mirror 15 to their retracted night position.

If the engine is shut off while the various parts of this apparatus are in their FIG. 2 position, the low intake manifold pressure applied to the chamber 51 is interrupted and atmospheric pressure is established in such chamber as leakage occurs past valve 76. When such pressure is established in the chamber, the spring 55 causes the valve member 53 to move from its FIG. 2 position to its FIG. 1 position. The mirror 15 stays in its retracted position because leakage past valve 70 permits all passages to attain atmospheric pressure.

When the engine is next started, the intake manifold pressure will be placed in communication with the compartment formed by housing 23 and diaphragm 29 through line 69, port 61, recess 67, port 63 and line 71. Accordingly, the mirror will be moved from its retracted FIG. 2 position to its FIG. 1 position. If it is desired to keep the mirror in its night position, the valve member 53 must be pushed into its FIG. 2 position.

If, while the apparatus is in the position shown in FIG. 1, i.e., the day position, the engine is shut off, the low intake manifold pressure applied to the compartment formed by housing 23 and diaphragm 29 is interrupted. Atmospheric pressure is then applied to such compartment through port 61, recess 67, port 63 and lines 71 and 69 when the intake manifold pressure rises back up to atmospheric pressure and as valves 70 and 76 leak, thus permitting spring 35 to return the mirror and other associated parts to the night position, i.e., the position shown in FIG. 2.

The check valves 70 and 76 prevent inadvertent operation of the actuating mechanism 21 if the intake manifold pressure might approach atmospheric levels temporarily.

When the engine is next started, the mirror will be moved from its night position to its FIG. 1 position as described above. It will be seen that the mirror will be moved from its retracted position to its day position whenever the engine is started, thus preventing the creation of stains on the mirror.

Another embodiment of the invention is illustrated in FIG. 3. This embodiment contains many of the parts of the embodiment shown in FIGS. 1 and 2 and like parts are indicated by corresponding reference numerals. The rear wall 77 of the mirror assembly is formed differently than rear wall 7 and includes a dimpled portion 79 having an opening 81 therein. A tubular guide and support member 83 is secured to portion 79. A wire, such as a Bowden cable 85, is secured at one end to the plate 45 and at the other end to a vacuum motor mechanism 87. Extending between plate 45 and wall 77 is a spring 88. A suitable shield 89 surrounds cable 85. The wire end of cable 85 is secured to a rod 91 which has a disc 93 connected on the end thereof. The rod 91 extends through a guide portion 95 of a cup-shaped housing 97. Disc 93 is secured to the central portion of a flexible diaphragm 99, the outer edges of which are secured to the outer edge of cup-shaped housing 97 by a channel-shaped clamping member 101. A compression spring 103 extends between the bottom of housing 97 and disc 93 and biases the diaphragm 99 towards the position shown in broken lines in FIG. 3. A suitable bracket 105 mounts the vacuum motor mechanism 87 and the end of shield 89 on the vehicle. It will be understood that the motor could be mounted in an enlarged housing for the fluid mirror assembly or it could be mounted in other positions on the vehicle, such as inside the door in the case of a door mounted mirror.

A line 107 extends between the housing 97 in the compartment formed by diaphragm 99 and such housing to the port 63 in the control assembly 3 shown in FIG. 1.

Operation of the apparatus shown in FIG. 3 is somewhat similar to the operation of the apparatus shown in FIGS. 1 and 2. When the manifold pressure is applied to line 107, the diaphragm 99 is moved to its FIG. 3 solid line position against the bias of spring 103. This causes the spring 88 to push the diaphragm 17 and mirror 15 to its day position, i.e., the position shown in FIG. 3. When atmospheric pressure is applied to line 107 and the chamber formed by diaphragm 99 and housing 97, the spring 103 biases the diaphrgam 99 to the broken line position shown in FIG. 3. Accordingly, the Bowden cable 85 pulls the diaphragm 17 and mirror 15 to a retracted or night position.

Another embodiment of the control assembly of this apparatus is illustrated at 109 in FIG. 4. This embodiment includes a body 111 having ports 61 and 63 therein to which are attached lines 69 and 71, respectively. A port 65 is also provided in body 111. A valve member 53a, generally similar to valve 53, is slideably mounted on body 111, and includes a ferromagnetic member 113. An electric coil 115 having a ferromagnetic core insert 116 is attached to the end of body 111. A spring 117 biases valve member 53a to the position shown in FIG. 4 wherein ports 61 and 63 are placed in communication with one another by recess 67. When the valve member is in the position shown in FIG. 4 and the engine is running, the intake manifold pressure will be applied to the chamber or compartment formed by housing 23 and diaphragm 29, thus causing the mirror to be located in its FIG. 1 position. When it is desired to move the mirror to its night position, the valve member 53a is manually moved to a position placing port 63 in communication with the atmosphere through port 65. Thus, the compartment formed by housing 23 and diaphragm 29 is placed at atmospheric pressure and the spring 35 moves the mirror 15 to its night position. Coil 115 is energized whenever the engine is operating, and hence holds valve member 53a by means of the ferromagnetic member 113, in a position to maintain communication between ports 63 and 65.

If the mirror is not in its night position and the engine is stopped, the coil 115 is de-energized and the spring 117 moves the valve member 53a back to the position in which port 61 is placed in communication with port 63. Since the compartment formed by housing 23 and diaphragm 29 is at atmospheric pressure, the mirror remains in its night position. When the engine is next started, the intake manifold pressure is applied to the compartment formed by housing 23 and diaphragm 29 and the mirror moves to its day position as described above.

If the mirror is in the day position and the engine is stopped, the compartment formed by housing 23 and diaphragm 29 will be brought up to atmospheric pressure as the pressure in the intake manifold rises back to atmospheric pressure.

It will be seen that in any of the embodiments disclosed herein the mirror is normally retained in a retracted or night position whenever the engine is stopped but will be moved automatically to the day position whenever the engine is started. Thus, it is unlikely that the fluid light controlling medium will create a stain on the mirror.

In view of the foregoing, it will be seen that the several objects and other advantages of this invention are achieved.

Although several embodiments of the invention have been disclosed and described, it is apparent that other embodiments and modifications of the invention are possible.

I claim:

1. Control apparatus for a fluid immersed mirror connected to a vehicle having an engine, comprising means for moving said mirror between a day position and a night position, said means including actuating means for actuating said mirror between said day and night position and control means for controlling operation of said actuating means, said control means and said actuating means each being movable to a first position in which said mirror will be moved to one of its positions when the engine of said vehicle is operating and to a second position in which said mirror will be moved to the other of its positions when said engine is operating, said actuating means causing said mirror to be located in one of its said positions when the engine is not operating, said control means including valve means, a first line connecting said valve means to a subatmospheric pressure component of the engine, a second line connecting said valve means to said actuating means, said valve means having a first operative position in which said first and second lines are placed in communication with one another, said actuating means, when placed in communication with the subatmospheric pressure, moving said mirror to its day position, means biasing said valve means toward said first operative position and holding said valve means in said first operative position when the engine is not operating, said actuating means moving said mirror to its night position when the pressure in said second line is approximately equal to atmospheric pressure, said actuating means automatically moving said mirror to its day position in response to initial operation of the engine.

2. Control apparatus as set forth in claim 1 wherein said valve means includes a body having a chamber therein, a port extending through said body placing said chamber in communication with the atmosphere, said valve means having a second operative position in which said second line is placed in communication with said port.

3. Control apparatus as set forth in claim 2 further including means for holding said valve means in said second operative position when said valve means is so positioned and the engine is operating.

4. Control apparatus as set forth in claim 3 wherein said means for holding said valve means in said second operative position includes a third line extending from said chamber to said first line.

5. Control apparatus as set forth in claim 1 wherein said valve means includes a body having a chamber therein, a valve member movable in said chamber, and said means biasing said valve means comprising a spring biasing said valve member outwardly of said chamber.

6. Control apparatus as set forth in claim 5 wherein said valve means has a second operative position, an electric coil on said body, said coil upon energization being adapted to hold said valve means in said second position.

References Cited

UNITED STATES PATENTS

| | | | |
|---|---|---|---|
| 1,195,757 | 8/1916 | Werrtz | 350—280UX |
| 1,913,874 | 6/1933 | Folberth | 350—278 |
| 2,906,292 | 9/1959 | Mayo | 350—289X |
| 2,977,984 | 4/1961 | Barnes | 137—625.64 |
| 3,036,598 | 5/1962 | Smith et al. | 137—596.16 |
| 3,233,515 | 2/1966 | Platzer, et al. | 350—267 |

JOHN K. CORBIN, Primary Examiner

U.S. Cl. X.R.

350—267